United States Patent
Few

(12) 
(10) Patent No.: US 6,227,237 B1
(45) Date of Patent: May 8, 2001

(54) HOSE STORAGE AND DRAINAGE APPARATUS

(75) Inventor: Jeffrey P. Few, Elkhart, IN (US)

(73) Assignee: Norco Industries, Co., Elkhart, IN (US)

( * ) Notice: Subject to any disclaimer, the term of this patent is extended or adjusted under 35 U.S.C. 154(b) by 0 days.

(21) Appl. No.: 09/307,542

(22) Filed: May 7, 1999

(51) Int. Cl.[7] ........................................................ F16L 3/00
(52) U.S. Cl. ........................ 137/355.16; 137/355.12; 137/355.28; 137/360; 251/149.6
(58) Field of Search .................... 137/355.12, 355.16, 137/355.28, 360; 251/149.6

(56) References Cited

U.S. PATENT DOCUMENTS

| | | |
|---|---|---|
| D. 119,969 | 4/1940 | Teetor . |
| D. 282,903 | 3/1986 | Baker . |
| 1,155,262 * | 9/1915 | Mock .............................. 137/355.28 |
| 1,750,964 * | 3/1930 | Nuhring ......................... 137/355.28 |
| 1,844,259 * | 2/1932 | Meyer ............................ 137/355.28 |
| 1,904,063 * | 4/1933 | Lund .............................. 137/355.28 |
| 2,367,141 * | 1/1945 | Rosenblum ..................... 137/355.28 |
| 2,451,368 | 10/1948 | White et al. . |
| 2,634,071 * | 4/1953 | Lund .............................. 137/355.28 |
| 3,217,891 | 11/1965 | Weaver . |
| 3,312,434 | 4/1967 | Simon . |
| 3,670,763 * | 6/1972 | Magdars ......................... 137/355.18 |
| 3,736,952 * | 6/1973 | Thompson ...................... 137/355.28 |
| 3,749,118 * | 7/1973 | Berg ............................... 137/355.28 |
| 3,835,879 | 9/1974 | Thoman . |
| 4,134,499 | 1/1979 | Joswig . |
| 4,216,931 | 8/1980 | Harless et al. . |
| 4,836,479 | 6/1989 | Adams . |
| 5,027,478 * | 7/1991 | Suhr ................................ 24/16 R |
| 5,119,844 * | 6/1992 | Cannon et al. .................. 137/382 |
| 5,269,354 | 12/1993 | Koberg . |
| 5,325,898 | 7/1994 | Forgnone . |
| 5,544,858 * | 8/1996 | Rogers et al. .................. 251/149.6 |
| 5,641,007 | 6/1997 | Falk . |
| 5,667,195 | 9/1997 | McCormick . |
| 5,678,599 | 10/1997 | Moss . |
| 5,678,700 | 10/1997 | Crosson, Jr. . |
| 5,699,987 | 12/1997 | Romaneschi et al. . |
| 5,853,142 * | 12/1998 | Anderson ....................... 242/615.2 |
| 5,875,812 * | 3/1999 | Miller ............................. 137/360 |

* cited by examiner

*Primary Examiner*—A. Michael Chambers
*Assistant Examiner*—Thomas L. McShane
(74) *Attorney, Agent, or Firm*—Oldham & Oldham Co., LPA

(57) ABSTRACT

A wall mountable rack-like structure that may be used to conveniently store and at the same time drain one or more hoses commonly used to convey liquid substances such as hydraulic liquids, fuels, coolants and the like. The structure includes a horizontal bracket having a plurality of projections that define a number slots capable of receiving an end portion of a hose. The horizontal bracket is spaced at a vertical distance below the a horizontal top portion of the rack. The vertical distance is selected so that hose end couplings having spring-biased, quick connect/disconnect valves may be snugly inserted between the bracket and the top portion. When the hose end couplings are inserted between the bracket and the top portion, the tip of the spring biased valve engages the top portion and is depressed, thereby opening the valve and allowing any liquid within the hose to downwardly drain to the horizontal bottom of the rack. The horizontal bottom is provided with an elongated, centrally located opening through which the drained liquid may flow into a receptacle located below.

10 Claims, 3 Drawing Sheets

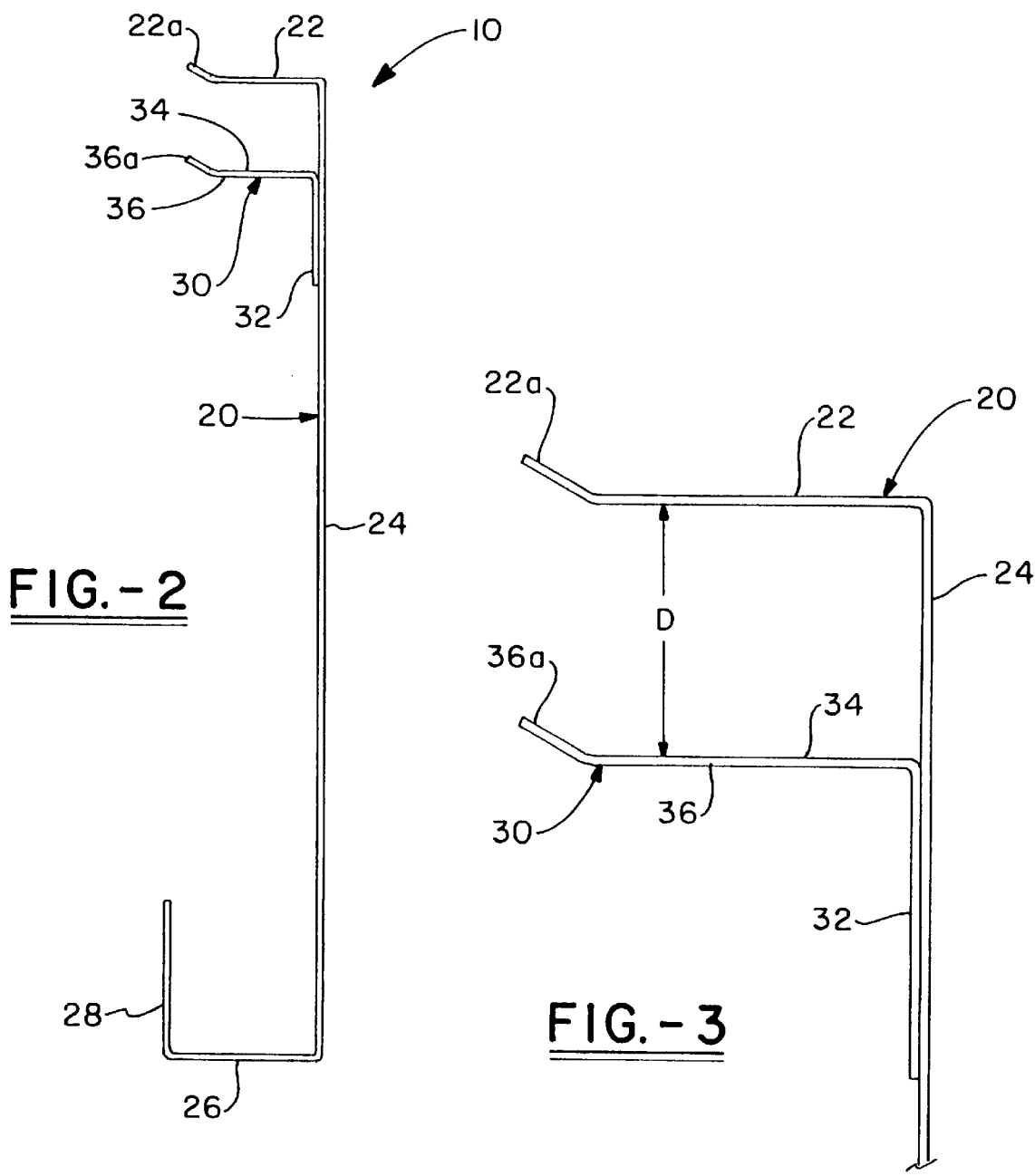
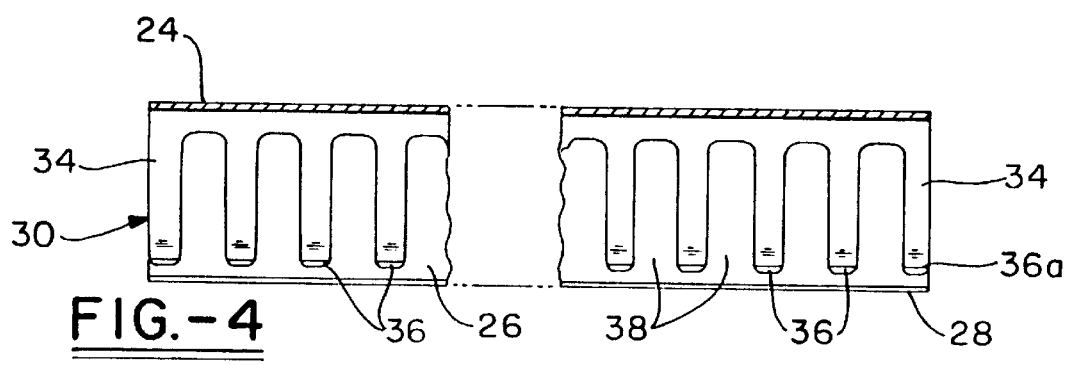

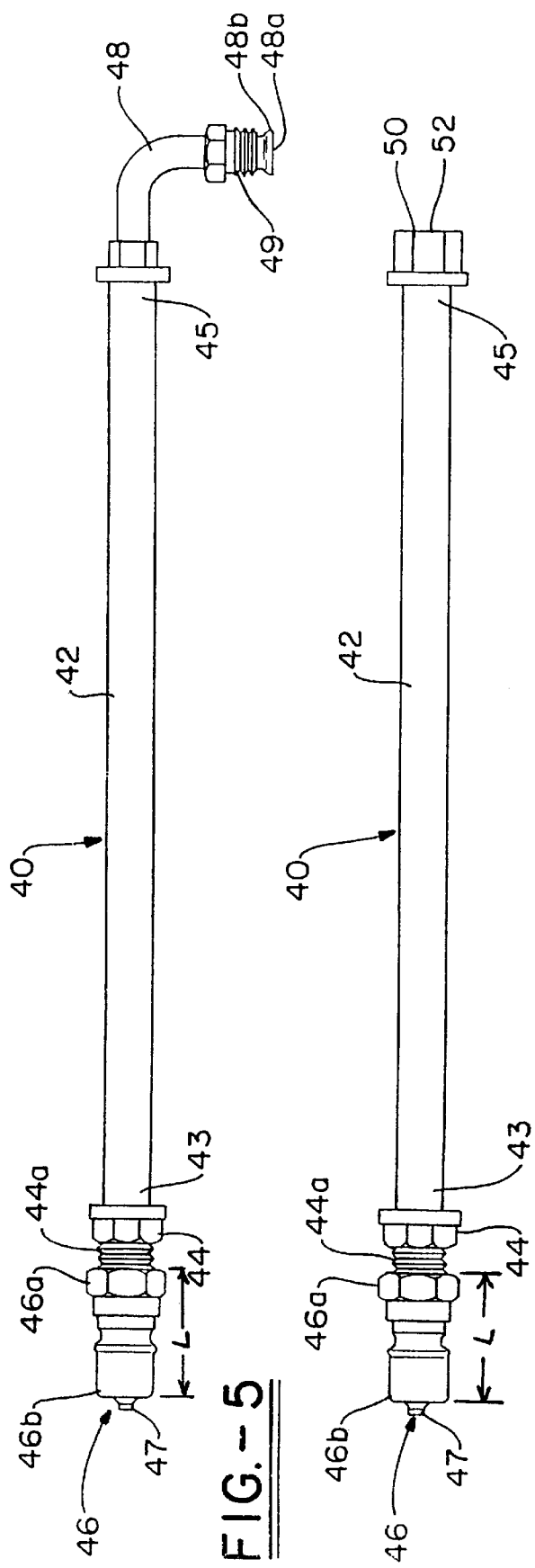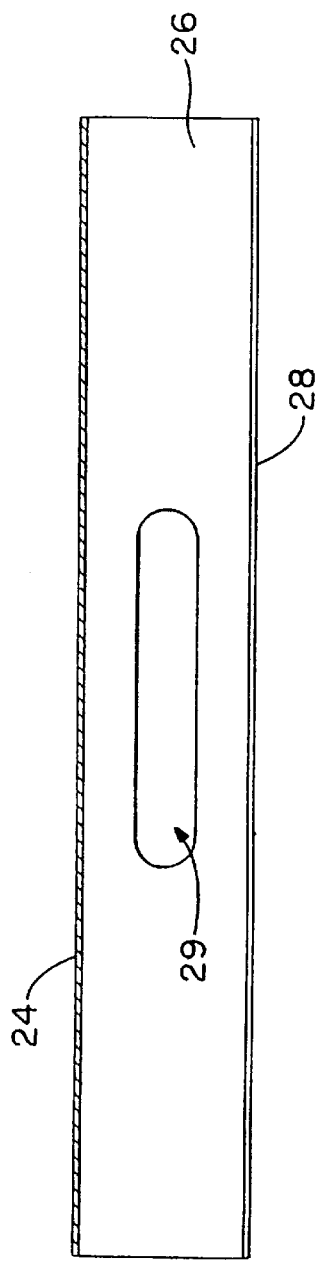
FIG.-5
FIG.-6
FIG.-7

HOSE STORAGE AND DRAINAGE APPARATUS

FIELD OF THE INVENTION

The present invention relates generally to a hose storage and drainage apparatus, and more specifically to a wall mountable apparatus that may be used to conveniently store and at the same time drain one or more hoses commonly used to convey liquid substances such as hydraulic liquids, fuels, coolants and the like.

BACKGROUND OF THE INVENTION

Hoses are frequently employed in industrial and automotive equipment to transport a wide variety of liquids from one component and/or system to another in order to accomplish various functions. For example, automotive equipment will employ hoses to transport fuels such as gasoline and diesel from one or more fuel storage tanks to fuel pumping devices and carburetion systems of internal combustion engines. Hoses will also be employed to transport hydraulic liquids within power braking and steering systems and other systems as may be required to perform tasks including lifting, pushing, pulling, tilting or the like. Coolants may also be conveyed between heat generating and dissipating components and systems of engines and production machinery. In many instances, the hoses used in applications like those just described, and others, will be provided with means for connecting the their ends to fluid supply reservoirs, equipment components which utilize or consume the fluids, etc. The connecting means may be male or female, sleeve-like metallic fittings provided with threaded interior or exterior surfaces for making secure, leak-proof engagement with other connecting hardware like metal tubing or any of a number of other known connecting devices. A commonly encountered hose and hardware combination is one where one end of the hose will be provided with a quick connect/disconnect fixture and the other end will be provided with a very simple connection means which, when it is disengaged from the equipment, will leave the end of the hose with which it is associated fully open and in communication with the atmosphere. The opposite end of the hose, i.e., the end having the quick connect/disconnect fixture, will not be open in a like manner to the atmosphere when it is disconnected, as the quick connect/disconnect fixture includes a spring biased closure member that, when the fixture is disengaged from the equipment, seals off a fluid flow orifice leading into the hose. It should be evident that hoses having the described hardware combination will not be self-draining. They will require that the spring biased closure member be depressed by some external means before any fluid present within the hose at the time of its disengagement from the equipment may freely drain therefrom. Storage and drainage of hoses having the described hardware configuration are most likely to be required when the equipment with which the hoses normally are employed is in need of maintenance and/or repair, and such maintenance and/or repair necessitates the disassembly of equipment parts, including the hoses. In such a situation a need exists for an apparatus which not only is capable of securely and neatly storing the hoses, but also allows the hoses to be quickly drained of fluid present within them and for that fluid to be captured with little or no mess and to be efficiently disposed of.

SUMMARY OF THE INVENTION

The present invention is a wall mountable hose storage and drainage apparatus comprised of a rack-like structure formed from thin sheet metal. The main body of the rack has a top portion that extends in a generally horizontal fashion from the top end of a vertically extending back portion. The rack further has a horizontal bottom that projects outwardly from the bottom end of the vertical back portion and parallel to the rack's top portion. Extending vertically upward from the bottom portion is a front member that is generally parallel to the back portion of the rack. A horizontal bracket having a plurality of projections that define a number slots capable of receiving an end portion of a hose is fastened to the back portion. The horizontal bracket is spaced at a vertical distance below the top portion of the rack. The distance is selected so that metal hose end couplings having spring-biased, quick connect/disconnect valves may be snugly inserted between the bracket and the top portion. When the hose end couplings are inserted between the bracket and the top portion, the tip of the spring biased valve engages the top portion and is depressed, thereby opening the valve and allowing any liquid within the hose to downwardly drain to the horizontal bottom of the rack. The horizontal bottom is provided with an elongated, centrally located opening through which the drained liquid may flow into a receptacle located below.

BRIEF DESCRIPTION OF THE DRAWINGS

FIG. 2 is a side planar view of the hose storage and drainage apparatus of the present invention.

FIG. 3 is an an enlarged side planar view of the hose storage and drainage apparatus of the present invention, made in the top region of the apparatus.

FIG. 4 is a cross-sectional view of the hose storage and drainage apparatus of the present invention, taken along the line 4—4 of FIG. 1.

FIG. 5 is a side planar view of a known, exemplary hose that may be stored upon and drained by the apparatus of the present invention.

FIG. 6 is a side planar view of yet another known, exemplary hose that may be stored upon and drained by the apparatus of the present invention FIG. 7 is a cross-sectional view of the hose storage and drainage apparatus of the present invention, taken along the line 7—7 of FIG. 1.

DETAILED DESCRIPTION OF THE PREFERRED EMBODIMENT

Figure 1:
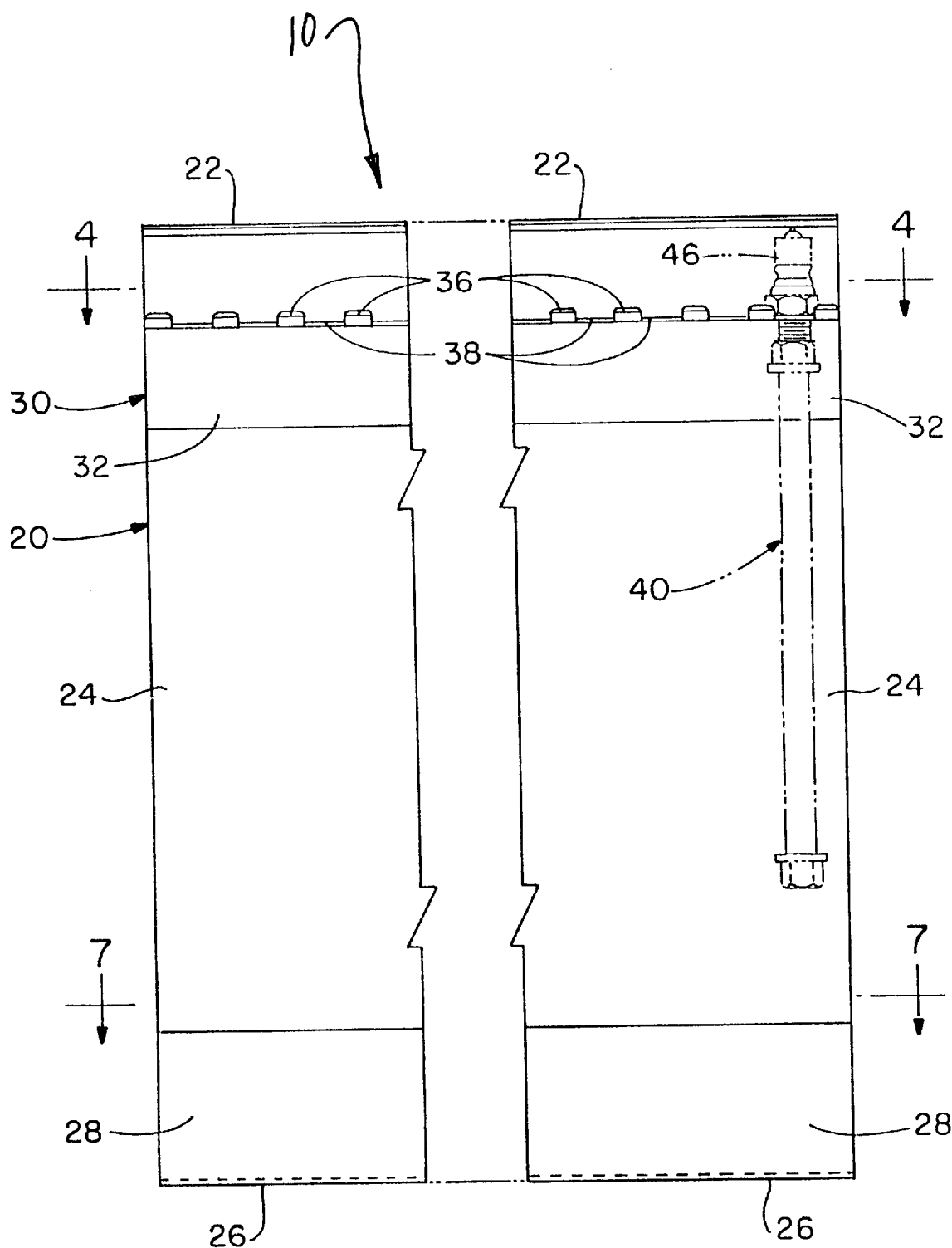
FIG. 1 is a front planar view of the hose storage and drainage apparatus of the present invention.

A hose storage and drainage apparatus in accordance with a preferred embodiment of the present invention is indicated generally in FIG. 1 by the reference numeral 10. The apparatus 10 is a rack-like structure fabricated from thin sheet metal. The main body 20 of the apparatus 10 is formed by bending a first piece of sheet metal so that it includes a top portion 22, seen in FIGS. 2 and 3, that extends in a generally horizontal manner from a top juncture with vertically extending back portion 24. The main body 20 further includes a horizontal bottom 26, seen in FIG. 2, that projects outwardly from a bottom juncture with the back portion 24, and a front panel member 28 that extends vertically upward from a frontal juncture with the bottom 26, and in so extending, is oriented parallel to the back portion 24. It will be noted by reference to FIGS. 1 and 2 that the front panel member 28 extends upwardly a relatively short distance, thereby leaving exposed the vast majority of the front surface of the back portion 24 for reasons which will hereafter become evident.

As shown in FIG. 3, the apparatus 10 is also comprised of a horizontal bracket 30. The bracket 30 is formed from a second piece of sheet metal and includes a back portion 32 and a top portion 34. The bracket 30 is secured at its back portion 32 to the front surface of back portion 24 of the main body 20 by known means such as riveting, spot welding, threaded fasteners, or the like. The top portion 34 extends perpendicularly outwardly from back portion 24 of the main body 20. As shown in FIG. 4, the top portion 34 is provided with a plurality of finger-like projections 36 which define a plurality of elongated slots 38 therebetween. Each of the elongated slots 38 is open at its outer end and closed at its inner end. The inner end of each of the slots 38 is semicircularly shaped and is capable of receiving a hose 40 as indicated in FIG. 1 of the drawings.

As previously indicated, the apparatus 10 is intended to be particularly useful as a storage and drainage means for hoses equipped with a quick connect/disconnect valve. Two examples of such hoses are provided in FIGS. 5 and 6 of the drawings. The hose 40 shown in FIG. 5 is comprised of a flexible body 42 provided with a central passageway of circular cross section (not shown), extending fully from a first end 43 to an opposing second end 45 of the body 42. The first end 43 is provided with a sleeve-like metallic fitting 44. The fitting 44 has two male ends, the first of which is non-threaded (not shown) and fits snugly within the central passageway of the first end 43 and the second of which is provided with a threaded region 44a on its external surface. Like the body 42, the fitting 44 has a central passageway (not shown) extending therethrough, which communicates with the passageway provided in the body 42. A quick connect/disconnect valve assembly 46 is affixed to the fitting 44. The assembly 46 has a female end 46a and a male end 46b. The female end 46a is provided with a threaded region (not shown) about its inner surface, which allows the female end 46a to airtightly receive the threaded region 44a of the fitting 44. The assembly 46 is further provided with a central longitudinal bore (not shown) extending from the female end 46a to the male end 46b and forming an orifice therein. The central longitudinal bore of the assembly 46 has therein a known compression coil spring (not shown) that engages a plunger-like closure member 47 and biases the closure member 47 toward the orifice provided in the male end 46b and causes the closure member to airtightly seal the orifice when the assembly 46 is disengaged from a female receptacle which is part of the equipment (not shown) with which the hose 40 is used.

The second end 45 of the body 42 of the hose 40 is provided with a tubular metallic fitting 48 having a 90-degree bend at its mid-section. The fitting 48 includes two non-threaded male ends. The first end (not shown) fits securely within the central passageway of the second end 45. The second end 48a includes and outwardly flared tip 48b that is insertable into a threaded female receptacle of the equipment (not shown) with which the hose 40 is used. The second end 48a is secured within the receptacle by the threaded compression sleeve 49.

FIG. 6 also shows a hose 40 which is alike in all respects to the hose 40 shown in FIG. 5 except for the second end 45 of the body 42. Instead of having a fitting like the tubular fitting 48. The hose 40 is provided on the second end 45 with a sleeve-like metallic fitting 50 resembling the fitting 44 on the first end 43; however, the fitting 50 has a non-threaded male end (not shown) that fits snugly within the central passageway of the second end 45 and an internally threaded female end 52 that can receive an externally male threaded equipment connection (not shown). Like the fitting 44, the fitting 50 has a central passageway (not shown) extending therethrough, which communicates with the passageway provided in the body 42.

From the foregoing discussion regarding the exemplary hoses 40, it will be evident that when either of them are disconnected from the equipment with which they are used the first end 43 will be closed to the surrounding atmosphere as the plunger member 47 of the quick connect/disconnect valve assembly 46 seals end 43, and the second end 45 will be open to the surrounding atmosphere as neither the fitting 50 nor the tubular fitting 48 are provided with any sealing means therein. Thus, any liquid present within the body 42 of the hose 40 will remain there unless and until the first end 43 is open to the atmosphere by the plunger 47 being depressed axially inward within the valve assembly 46.

Returning to FIG. 3, it will be noted that the top portion 34 of the bracket 30 is positioned a distance "D" below the underside of the top portion 22 of the main body 20 so that the portion 34 and the portion 22 are parallel to one another. By selecting the distance "D" to be equal to the length "L" of the body of the valve assembly 46 (FIGS. 5 and 6) and by securing the bracket 30 to the main body 20 in the manner previously described, the hose 40 may be inserted into one of the elongated slots 38 such that the sleeve-like fitting 44 is received by the slot 38 and the valve assembly is securely held in a vertical fashion between the top surface of portion 34 of the bracket 30 and the underside of the top portion 22 of the body 20. As the hose is inserted into the elongated slot 38 in the manner just described and the bottom end of the assembly 46 makes contact with the portion 34, the plunger member 47 makes contact with the underside of portion 22, and as the assembly 46 is pushed further into the slot 38, the portion 22 causes the plunger member 47 to be depressed axially into the assembly 46 and to open the assembly and the first end 43 of the hose to the surrounding atmosphere. Upon the first end 43 being so opened, any fluid present in the body 42 of the hose 40 flows downwardly out of the hose 40 via the force of gravity and continues its downward travel until it encounters the horizontal bottom 26 of the body 20.

As will be most clearly seen by reference to FIG. 7, the horizontal bottom 26 has a centrally located elongated orifice 29. The elongated orifice 29 receives fluid which has drained from the hoses 40 and permits passage of the fluid therethrough to any of a number of known receptacles which would be suitable for catching the fluid and transporting it to a suitable disposal site.

FIGS. 2 and 3 show that both the top portion 22 of the body 20 and each of the finger-like projections 36 of the top portion 34 of the bracket 30 are provided with upwardly angled ends 22a and 36a The angled ends 22a and 36a facilitate insertion and removal of the quick connect/disconnect assembly 46 into the space between the portions 22 and 34.

While the preferred embodiment of the invention has been described above, it will be recognized and understood that various modifications may be made therein and the appended claims are intended to cover all such modifications which may fall within the spirit and scope of the invention.

What is claimed is:

1. An apparatus for storing a hose assembly, the hose assembly comprising a hose body with a first end and a second end; the first end fitted with a fitting assembly having a closed position when a biased plunger fully extends axially outward a distance measured from a first radial surface on the fitting assembly and having an open position when the plunger is compressed axially inwardly, the fitting assembly having a body length, also measured from the first radial surface, the apparatus comprising:

a back member;

a top member joined to the back member and extending outwardly therefrom; and a bracket having a plurality of hose receiving slots, the bracket secured to the back member beneath and parallel to the top member, defining a spacing between a top surface of the bracket and a bottom surface of the top member, the spacing being less than the distance and greater than the fitting assembly body length, such that a hose inserted in one of the hose receiving slots with the first radial surface supporting the hose in the slot will be retained in the apparatus with the fitting assembly held between the top member and the bracket, in the open position.

2. The apparatus of claim 1, wherein the bracket comprises a plurality of finger-like projections in spaced-apart relationship, the spaced apart relationship defining the plurality of hose receiving slots.

3. The apparatus of claim 1, further comprising:

a bottom member, an inner end of which extends outwardly from a bottom juncture of the back member, said bottom juncture located below the bracket.

4. The apparatus of claim 3, wherein the bottom member further comprises a front panel member extending upwardly along an outer edge of the bottom member.

5. The apparatus of claim 3, wherein the bottom member further has an aperture therethrough, the aperture providing a passage through which any drainage from the hose body may flow from the bottom member.

6. The apparatus of claim 1, wherein each of the plurality of hose receiving slots is open at an outer end and closed at an inner end, said inner end being semicircularly shaped.

7. The apparatus of claim 1, wherein each of the plurality of hose receiving slots has a width which is larger than a diameter of the hose body and is smaller than a diameter of the fitting assembly at the first radial surface.

8. The apparatus of claim 1, wherein an outer edge of the top member is angled upwardly.

9. The apparatus of claim 1, wherein an outer edge of at least one of the plurality of finger-like projections is angled upwardly.

10. The apparatus of claim 3, wherein the top member, the back member and the bottom member are formed from a single thin piece of sheetmetal.

* * * * *